P. BAILEY.
Grain Fan.
No. 27,417.
Patented March 13, 1860.
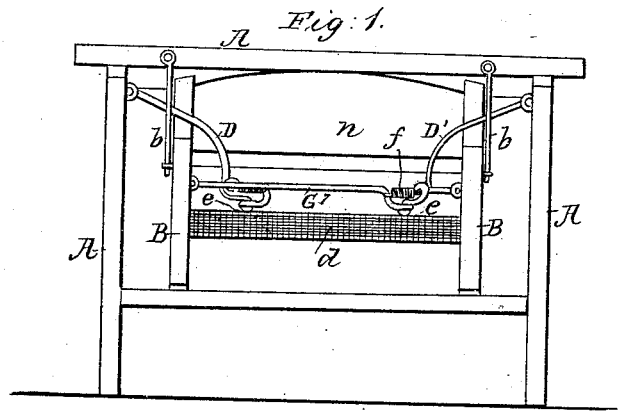
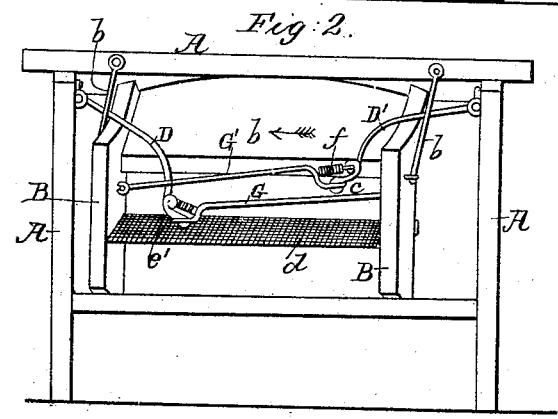
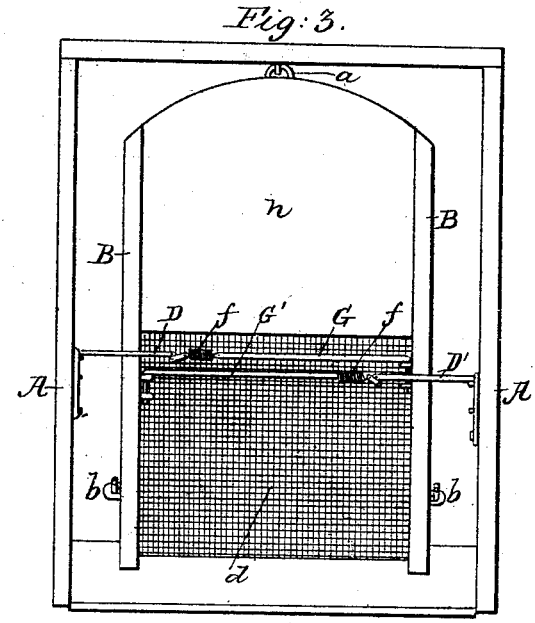
Witnesses.
Henry Howson
Horace Lee
Inventor.
Peter Bailey

UNITED STATES PATENT OFFICE.

PETER BAILEY, OF FALLS TOWNSHIP, BUCKS COUNTY, PENNSYLVANIA.

GRAIN-FAN.

Specification of Letters Patent No. 27,417, dated March 13, 1860.

*To all whom it may concern:*

Be it known that I, PETER BAILEY, of Falls township, Bucks county, Pennsylvania, have invented a new and useful Improvement in Grain-Fans; and I do hereby declare the following to be a full, clear, and exact description of the same, reference being had to the accompanying drawing, and to the letters of reference marked thereon.

My invention consists of certain coupled rods jointed to the stationary frame, and to the shaker of an ordinary grain fan, arranged in respect to the sieve, and to the inclined plane down which the grain and chaff pass to the said sieve, and operating substantially as described hereafter, so a to agitate the grain and chaff as it falls from the inclined plane, and insuring such a thorough exposure of the chaff to the current of air as will facilitate its separation from the grain.

In order to enable others skilled in this class of machinery to make and use my invention, I will now proceed to describe its construction and operation.

On reference to the accompanying drawing which forms a part of this specification, Figure 1 is an end view of sufficient of a grain fan to illustrate my improvement. Fig. 2 the same with my improvement shown in a position differing from that illustrated in Fig. 1, and Fig. 3 a ground plan of Figs. 1 and 2.

Similar letters refer to similar parts throughout the several views.

A represents part of the box or frame of an ordinary grain fan, B the vibrating frame or shaker which is loosely connected at $a$ to the rear end of the frame A and loosely suspended in front by rods $b$, $b$ to the front of the same frame, a lateral vibrating motion being imparted to the shaker by any of the ordinary appliances used for that purpose in ordinary grain fans. This frame B has the usual inclined plane $h$ down which the grain and chaff descend and from the edge of which they fall on to the sieve $d$, a strong current of air from the usual blowing fan passing between the sieve and inclined plane.

To the inside of the frame A is jointed a bent rod D, and to the opposite side of the frame is jointed a similar rod D', the rod D being jointed to a rod G, and the rod D' to a rod G'. The rod G is loosely communicated to one side of the shaker B and the rod G' to the opposite side of the shaker. These rods are situated near the front edge of the shaker B and are so bent and arranged that when the shaker has been moved in the direction of the arrow, the coupling $e$ of the rods D' and G' will be elevated and the coupling of the rods D and G' depressed as seen in Fig. 1, the coupling of the last mentioned rods being elevated and the opposite coupling depressed when the shaker has been moved in the direction contrary to that pointed out by the arrow, so that by the usual shaking movement is imparted to the frame B, the couplings as well as the rods themselves, will have a rapid vertical reciprocating motion, and will consequently toss up, and agitate the grain and chaff as it falls from the inclined plane, thus insuring such a thorough exposure of the chaff to the current of air, as will facilitate its separation from the grain.

It will be observed that where the rods are coupled together both are bent and that from the bent portion of one rod to that of the other extends a spiral spring $f$, which tends to draw the rods toward each other and facilitates their descent after they have been elevated as described above. Making the coupled portions of the rods heavy or suspending a weight to the couplings will serve the same purpose as the spiral spring.

I claim as my invention and desire to secure by Letters Patent—

The coupled rods D and G and D' and G' jointed to the frame A and to the shaker B, arranged in respect to the inclined plane $b$, and sieve $d$, and operating substantially as set forth.

In testimony whereof, I have signed my name to this specification, in the presence of two subscribing witnesses.

PETER BAILEY.

Witnesses:
 HENRY HOWSON,
 CHARLES D. FREEMAN.